Sept. 15, 1925.  
H. M. BIEBEL  
SECTIONAL BAKE OVEN  
Filed May 10, 1922  
1,553,357  
2 Sheets-Sheet 1

WITNESSES:  
P. H. Crock  
H. B. Funk

INVENTOR  
Herman M. Biebel.  
BY  
Wesley G. Carr  
ATTORNEY

Sept. 15, 1925.

H. M. BIEBEL 1,553,357

SECTIONAL BAKE OVEN

Filed May 10, 1922

WITNESSES:

INVENTOR
Herman M. Biebel
BY
ATTORNEY

Patented Sept. 15, 1925.

1,553,357

UNITED STATES PATENT OFFICE.

HERMAN M. BIEBEL, OF OAKMONT, PENNSYLVANIA, ASSIGNOR TO WESTINGHOUSE ELECTRIC & MANUFACTURING COMPANY, A CORPORATION OF PENNSYLVANIA.

SECTIONAL BAKE OVEN.

Application filed May 10, 1922. Serial No. 559,692.

*To all whom it may concern:*

Be it known that I, HERMAN M. BIEBEL, a citizen of the United States, and a resident of Oakmont, in the county of Allegheny and State of Pennsylvania, have invented a new and useful Improvement in Sectional Bake Ovens, of which the following is a specification.

My invention relates to ovens and particularly to electrically heated bake ovens and it has for one of its objects to provide a relatively simple unitary structure for a multiple-chamber baking oven, each chamber having a plurality of heating elements located therein.

Another object of my invention is to provide a plurality of complete individual oven units that may be assembled to form a unitary multiple-chamber bake oven, a single additional member completing the structure of the entire oven.

Another object of my invention is to provide a separate manual and a separate automatic controlling means for the heating elements of each chamber to permit of maintaining a substantially constant predetermined temperature in each chamber at all times.

It is highly desirable in many installations that a plurality of individual baking chambers be provided, the number of which may be easily and quickly increased as the business may require. Thus, it may appear desirable for an operator to install a single oven unit comprising a single baking chamber and then to add thereto, as the business grows, one or more additional oven units.

Another object of my invention is to provide a relatively simple structure for a multiple-chamber baking oven comprising a plurality of incomplete individual oven units that shall permit of increasing the number of individual oven units as may be desired.

My invention embodies a multiple-chamber baking oven comprising a plurality of superposed incomplete individual open-top oven chambers each defined by a plurality of heat-insulating walls, the entire structure being located on a suitable supporting frame. Front and rear metal frames, together with side bars connecting these frames, are employed to hold the walls of each oven unit in proper operative positions relatively to each other. The bottom portion of the upper oven unit serves to complete the structure of the lower oven unit and a cover member comprising a single heat-insulating panel completes the structure of the topmost oven unit.

Heating elements are located adjacent the top and the bottom of each of the oven chambers and a manual and an automatic circuit controlling means is provided for each of the oven units.

Means are provided for ventilating the oven chambers and further means are provided for securing all of the units together in proper operative position relatively to each other and on the supporting structure.

Figure 1:
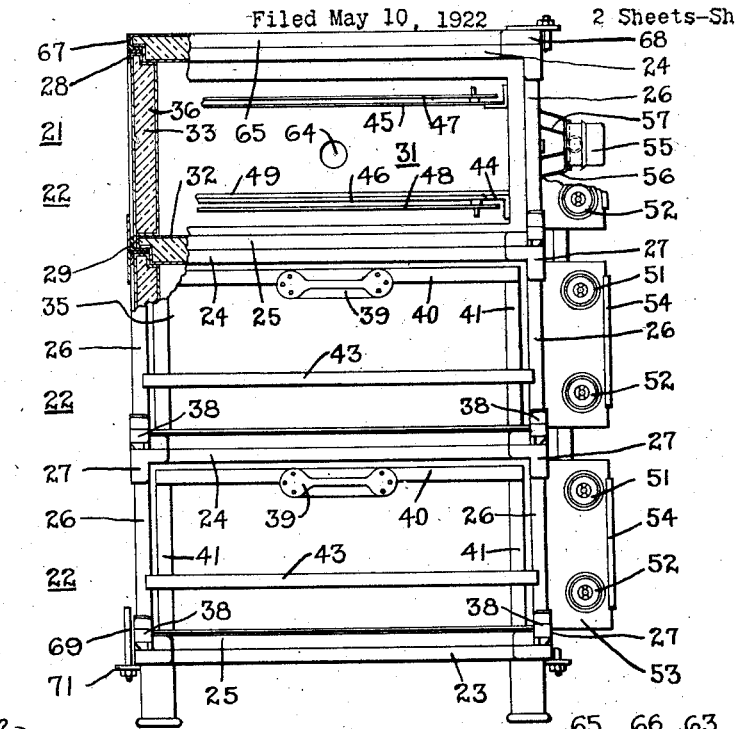
Figure 1 is a view, in front elevation, of an assembled bake oven embodying my invention, certain parts thereof being cut away.

My invention is closely related to, and is an improvement upon, the oven constituting the subject matter of the copending application of Frank Thornton, Jr., Serial No. 544,496, filed March 17, 1922, and assigned to the Westinghouse Electric Products Company. Certain features of construction employed by me are substantially identical with similar details disclosed in that application and reference will be made hereinafter thereto for information regarding such details.

An electric baking oven, designated as a whole by the numeral 21, comprises a plurality of individual incomplete baking oven units 22 which are located on a suitable supporting frame 23 which may be of any desired construction.

Each of the superposed oven units 22 comprises a front skeleton frame which is composed of a horizontally-extending upper angle bar 24, a bottom angle bar 25, vertically-extending side angle bars 26, which are suitably connected, at their adjacent ends, by means of metal gusset plates 27 so that the assembled members constitute a substantially rectangular skeleton frame. A rear frame comprises substantially similar members, thus constituting a rectangular frame substantially similar to the front frame. The front and rear frames are connected by a top angle bar 28 and a bottom angle bar 29 connected, at their ends, to integral side portions of the gusset plates 27 by any suitable means (not shown).

Each of the individual oven chambers 31 of the oven units 22 is surrounded or defined by a bottom heat-insulating panel 32, two side heat-insulating panels 33, a rear heat-insulating panel 34 and a heat-insulating door panel 35. Each of the hereinbefore mentioned panels is composed of two spaced-apart relatively thin sheet metal plates which are maintained in spaced-apart relation by integral flange portions on one of said plates and by a mass 36 of a suitable heat-insulating material, such as mineral wool. While the side, bottom and rear panels are substantially alike in general construction, certain details of construction vary in the different panels to permit of suitably assembling the same in the hereinbefore mentioned skeleton holding-means comprising the front and rear frames and the side bars connecting the same. The upper edge of the side panel is provided with a shoulder portion 37 having a depth substantially equal to one-half of the thickness of the panel, while at the lower edge thereof the two metal walls only, are extended a short distance for a purpose to be hereinafter set forth in detail. The bottom panel is provided with a shoulder portion 37 extending along the top and bottom, as well as the rear edge, thereof. The rear panel is provided with a shoulder portion 37 located at only the top edge thereof.

In building up the individual oven units, the skeleton rear frame hereinbefore described, is assembled and laid on a substantially horizontally-extending surface, after which the rear panel 34 is placed in proper operative position thereon. Then the bottom panel is placed in its proper operative position with its rear edge engaging the bottom edge of the rear panel and with the shoulder portion located outwardly or away from the metal frame (see Figs. 1 and 2). Then the two side panels may be placed in proper operative position, the shoulder portion 37 being placed at the top of the oven chamber. Then the front skeleton frame, constructed as hereinbefore described, is placed in proper operative position on the front ends of the side and bottom wall panels, after which the side bars 28 and 29 may be placed in position and suitably connected to the side extensions of the gusset plates 27 to securely clamp all of the panels and the front and rear metal frames in close operative engagement with each other.

Stationary hinge members 38 are mounted adjacent to the two sides of the front frame near the bottom edge thereof and the door panel 35, comprising front and back sheet metal walls, is pivotally supported by the hinge members 38 and a handle member 39 may be located adjacent to the top edge thereof. Metal bars 40 and 41, extending respectively horizontally and vertically of the door panel on the front surface, operate to provide a relatively stiff structure of the door to permit of its being opened and closed without distortion thereof. The hinge members 38 may be provided with integral forwardly extending portions 42 which co-operate with a horizontally extending bar 43 secured to the front of the door panel near the bottom thereof to limit the turning movement of the door. The general construction of the front and rear end frames, side, bottom and door panels is substantially the same as that described in the above mentioned copending application to which reference may be had for further details of construction.

Angle bar members 44 may be secured to the side panels adjacent the top and the bottom of the oven chambers to permit of locating in each of the chambers a top sheet metal plate 45 and a bottom metal plate 46 for securing in proper operative positions thereon electric heating elements 47 and 48, respectively, adjacent the top and the bottom of the chamber. A layer 49 of refractory material, such as tile, may be located above the bottom panel to serve as means for storing heat imparted thereto by the heating element located below the plate 46 to prevent unequal distribution of the heat over the surface thereof. The layer 49 also serves as a support upon which the material to be baked may be placed. Any suitable or desired construction of electric heating elements may be employed on such construction, being more particularly described in the hereinbefore mentioned application.

In order to permit of controlling the heating elements at the top and at the bottom of the oven chambers, I provide manually operable switches 51 for controlling the upper heating element in each of the oven units and substantially similar switches 52 for manually controlling the lower heating element in each of the oven chambers. I provide a casing 53 suitably secured against the side of each of the oven units adjacent the front end thereof in order to provide a mounting for the switches as well as to provide a means for covering the supply circuit conductors and the connections to the switch. A removable cover plate 54 is provided on each of the casings 53 to permit of ready access to the supply circuit conductors located within the casing.

In order to permit of automatically controlling the heating elements in each of the oven chambers, I provide a motor-operated switch 55 suitably secured against each of the individual oven units by brackets 56 and 57. The motor-operated switch is not a part of my invention and is more particularly described and claimed in the copending application of C. Aalborg and O. A. Colby, Serial No. 474,822, filed June 3, 1921, and assigned to the Westinghouse Electric & Manufacturing Company. A thermally actuated controlling means for the motor-operated switch comprises a thermostat 58 operatively associated with each of the oven units. While this thermal control member may be of any suitable or desired type, I prefer to employ that disclosed and claimed in a copending application of B. H. Smith, Serial No. 439,409, filed January 24, 1921, and assigned to the Westinghouse Electric & Manufacturing Company, to which reference may be had as to the operative details of the device. Means for carrying the supply circuit conductors between the casing 53 and the motor-operated switch 55 may comprise a relatively short conduit 59 extending therebetween. As it is desired to have the supply conductor circuits directly connected to the heating element in the individual oven units, enter the oven chamber through the rear panel, a conduit 61 is located on each of the oven units at one side thereof and extends from the casing 53 along the side of the oven unit and to a casing 62 located at the rear of the oven units 22. This construction is employed mainly to give a finished appearance to the entire structure.

A vertically extending sectional ventilating pipe 63 is located at the back of the oven units and has a portion extending into each of the individual oven chambers 31 through a suitable opening 64 in the rear panel. This construction is not described more fully in detail as any suitable or desired construction may be employed which will give the desired results.

Figure 2:
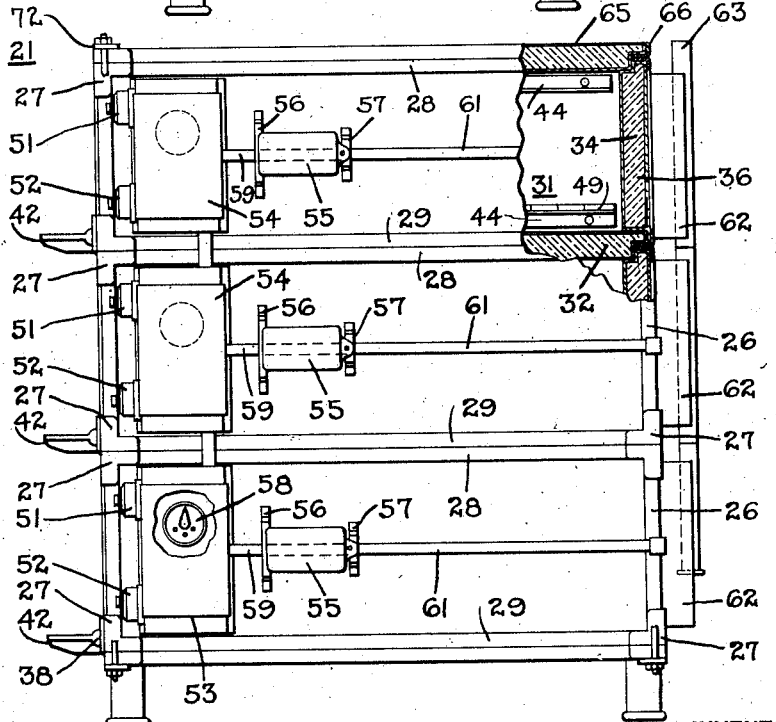
Fig. 2 is a view, in side elevation, of the oven illustrated in Fig. 1, certain parts thereof being cut away to show the internal construction thereof.
Figure 3:
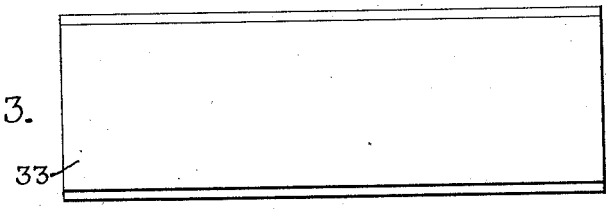
Figs. 3 and 4 are front elevation and end views, respectively, of a side panel comprising a portion of an individual oven unit.
Figure 4:
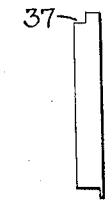
Figure 5:
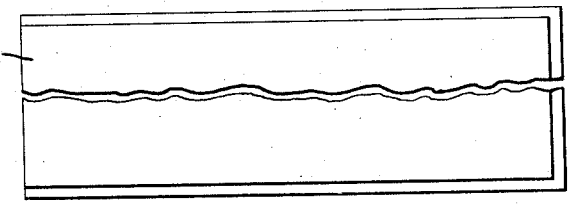
Figs. 5 and 6 are front elevation and end views, respectively, of a bottom panel.
Figure 6:
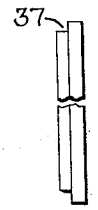
Figure 7:
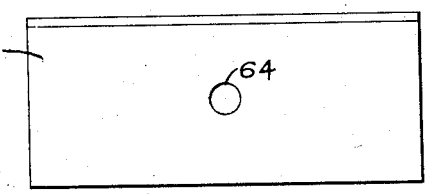
Figs. 7 and 8 are front elevation and end views, respectively, of a rear panel.
Figure 8:
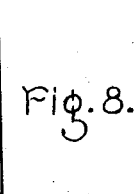

As illustrated in Figs. 1 and 2 of the drawings, the bottom panel of each of the upper individual units completes the structure of the lower oven unit, being effective to interposed a heat-insulting barrier between the two adjacent superposed oven chambers. In order to complete the structure of the assembled entire oven, I provide a top or cover panel 65 of substantially the same construction as the other panels and which may be provided with suitable front and rear angle members 66 and side angle bars 67 which may be connected by gusset plates 68 in order to provide a rugged structure which shall not be subject to deformation during the operation of the furnace. The cover member 65 co-operates with the topmost individual oven unit to complete the structure thereof and to constitute a closed baking chamber substantially the same as the lower baking chambers.

If desired, means for securely clamping together all of the superposed individual open units and the top cover member may be provided and may comprise a plurality of bolts 69, one being located at each corner of the assembled structure and operatively engaging a member 71 at the bottom which is secured to the supporting frame and a member 72 at the top which is secured to the top cover member 65.

While I have thus far described individual oven units which are constructed by the use of individual panels having shoulders at their edges, I may dispense with these shoulders and employ panels which are provided with plain edges and are otherwise the same as those hereinbefore described. This construction is diagrammatically illustrated in Fig. 9 of the drawings, in which a bottom panel 73, side panels 74, and a rear panel 75 are located in suitable spaced-apart relation to constitute an open-top and open-front oven chamber, a door panel 35, as hereinbefore described, being operatively associated therewith when the individual oven unit is built up complete. A top or cover member 76 completes the structure of the topmost individual oven unit, suitable angle bar members 77 being operatively associated with the top and bottom of the individual oven unit as also with the cover member, together with the hereinbefore described front and rear skeleton frames, to constitute a relatively rigid structure.

Figure 10:
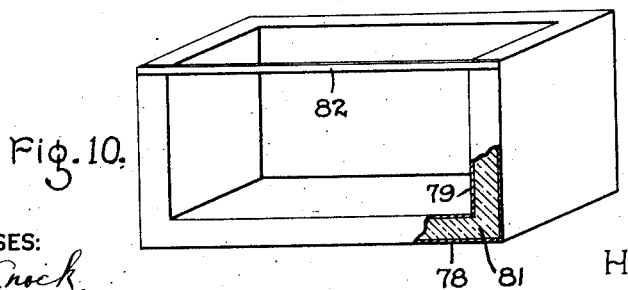
Fig. 10 is a diagrammatic representation of a still further modification of an oven unit embodying my invention.

If desired, practically the same units of a series of sizes of bake ovens and individual units may be built up of substantially integral bottom, side and rear wall panels, substantially as illustrated diagrammatically in Fig. 10 of the drawings. In this drawing, an outer sheet metal wall 78 is spaced apart from an inner sheet metal wall 79 by any suitable or desired spacing means and a mass 81 of a suitable heat-insulating material is placed therebetween, the entire construction providing an open-top open-front oven unit, the front top corners of which may be maintained in proper operative position relatively to each other by a horizontally-extending member 82 which may either be an angle bar or a flat bar.

Figure 9:
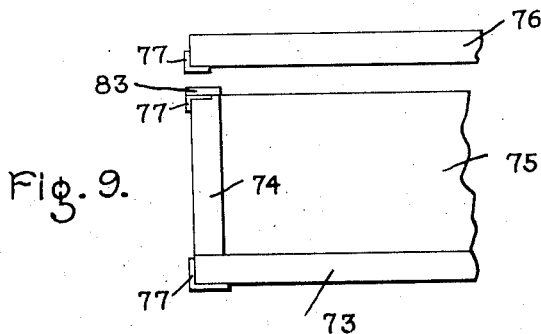
Fig. 9 is a diagrammatic representation of a modified form of construction of an individual oven unit and a cover member, embodying my invention.

If desired, additional heat-insulating means comprising flat strips 83, see Fig. 9, of a suitable heat-insulating material may be placed between the abutting portions of the superposed oven units and cover member.

The device embodying my invention thus provides a plurality of individual open-top heat-insulated oven chambers defined by a plurality of co-operating heat-insulating panels, the structure of each oven unit being completed by a portion of an upper or superposed oven unit or by a cover member placed upon the topmost oven unit. If desired, the construction embodying my invention permits of the installation of the supporting means and of a single oven unit provided with a cover member, to which may be added any desired number of additional units which may be placed in proper operative position upon the original oven unit by removing the cover member and placing them in superposed position on the original oven unit, the topmost unit being completed by placing the originally employed cover member thereon. The rods comprising the clamping means may be replaced by longer rods as the number of individual units increases, thus permitting of securing a continuous operative alinement of all of the parts of all the individual oven units in proper operative positions relatively to each other under all conditions of operation.

It is obvious that the first oven unit and the cover member may be raised above the supporting means to permit of placing a second and succeeding incomplete oven unit thereunder, the bottom of the superposed oven unit completing the structure of the oven unit next below it. This method of adding new units is a more laborious one than that first described but permits of leaving the cover member in its original engagement with the first oven unit.

It is also obvious that the entire structure of oven units may be reversed. That is, the cover panel may be placed directly on the supporting means and the properly constructed open-bottom oven unit be placed thereon, the two members constituting a complete oven unit. The only change in construction of the incomplete oven unit is that relating to the front door, which, of course, should open downwardly, as before. Any additional oven units may be placed upon the already installed unit, the open-bottom face thereof being closed by the top portion or panel of the underneath unit. The means for securing the assembled incomplete oven units in close operative engagement may be the same as heretofore described. This method of assembly of a plurality of units, particularly when the additional units are added one after the other, is a relatively simple one as the unit to be added to the already assembled units need only be placed thereon and the securing means installed and additional electric-circuit conductors provided to permit of suitably energizing the heating elements in the newly installed unit or units.

Various modifications may be made in the device embodying my invention without departing from the spirit and scope thereof and I desire that only such limitations shall be placed thereon as are imposed by the prior art or are specifically set forth in the appended claims.

I claim as my invention:

1. In a bake oven, in combination, a plurality of superposed individual removable oven units, each comprising a plurality of heat-insulating panels co-operating to form an incomplete oven unit, a heat-insulating panel for closing the otherwise incomplete oven unit, and means for alining said individual oven units in superposed position relatively to each other and for clamping all of said individual oven units in close operative engagement relatively to each other.

2. In a bake oven, in combination, lower and upper separable incomplete oven units located in close operative engagement, a closure member for the otherwise incomplete oven unit, and a plurality of electric heating elements so supported that one heating element is located at the top and one heating element at the bottom of each of said oven units.

3. In a bake oven, in combination, a plurality of superposed removable incomplete oven units each defined by a plurality of co-operating heat-insulating panels, means for holding the panels of each oven in proper operative position relatively to each other, and a heat-insulating panel constituting a closure member for the incomplete oven unit.

4. In a bake oven, in combination, a plurality of superposed removable individual oven units each comprising a plurality of heat-insulating panels co-operating to form an incomplete oven unit, a heat-insulating panel for closing the otherwise open oven unit, and electric heating elements adjacent the top and the bottom of each of said individual oven units, whereby the number of superposed oven units may be varied by the selective insertion or removal of an individual incomplete oven unit.

5. In a bake oven, in combination, a plurality of incomplete individual superposed removable oven units, a part of one unit completing the structure of an adjacent unit, and a heat-insulating panel for completing the structure of one end unit.

6. In a bake oven, in combination, a plurality of superposed individual incomplete removable oven units, each comprising a plurality of heat-insulating panels co-operating to form an open oven unit, a heat-insulating panel for closing the otherwise open end oven unit, and means for alining said oven units in superposed positions relatively to each other.

7. In a bake oven, in combination, a plurality of superposed removable open oven chambers, each defined by a plurality of cooperating heat-insulating panels, means for holding the panels of each oven in proper operative positions relatively to each other, and a heat-insulating panel constituting a closing member for the otherwise open oven chamber.

8. In a bake oven, in combination, a plurality of superposed individual removable oven units, each comprising a plurality of heat-insulating panels co-operating to form an open oven unit, the open faces of all but one of said oven units being closed by a panel of an adjacent oven unit, and a heat-insulating panel for closing the open face of said one oven unit.

In testimony whereof, I have hereunto subscribed my name this 6th day of May, 1922.

HERMAN M. BIEBEL.